2,655,384

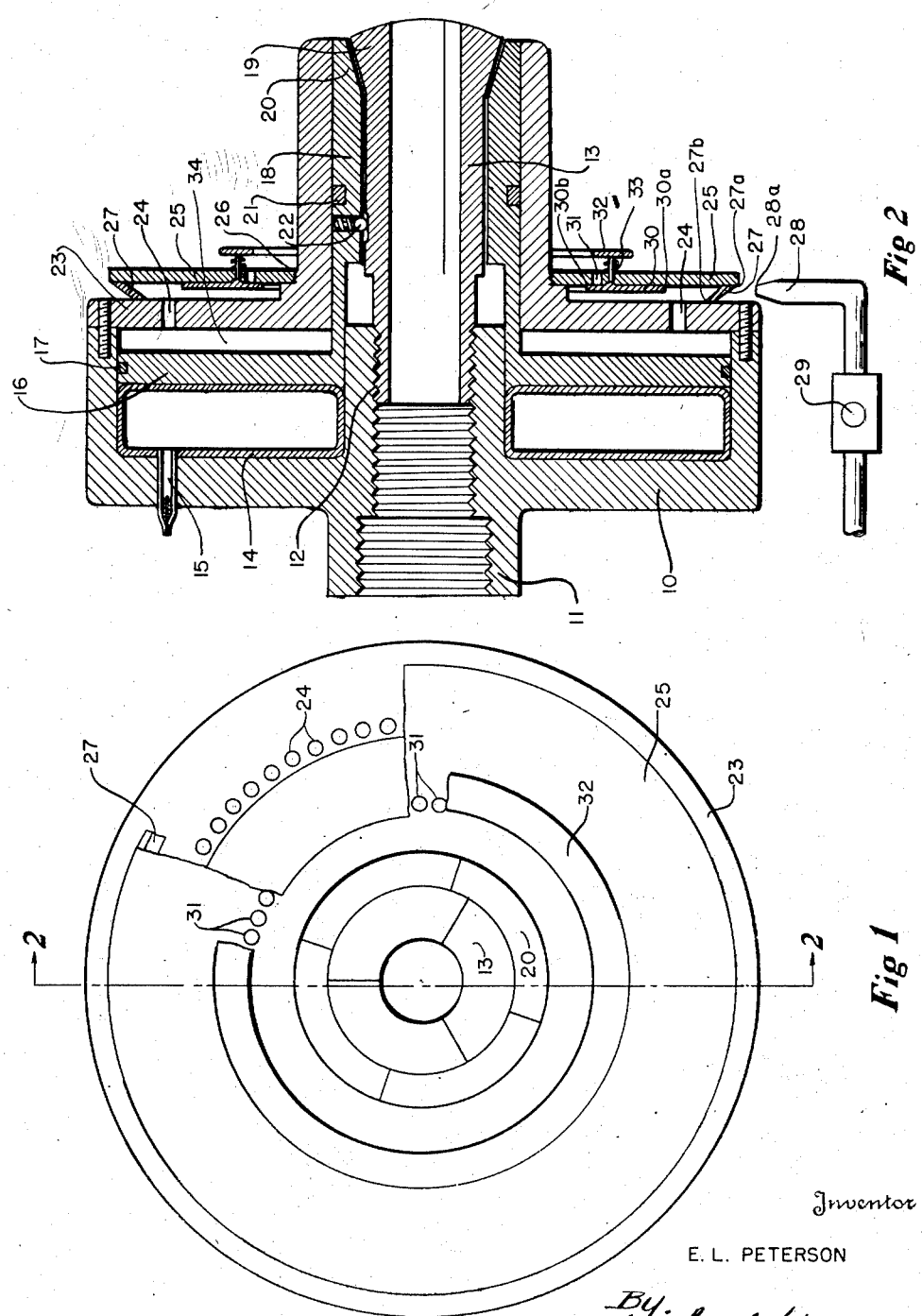
Oct. 13, 1953    E. L. PETERSON    2,655,384
PRELOADED AIR RELEASE CHUCK
Filed July 28, 1947
Inventor
E. L. PETERSON Patented Oct. 13, 1953

UNITED STATES PATENT OFFICE 2,655,384

PRELOADED AIR RELEASE CHUCK

Elwin L. Peterson, Falls Church, Va.

Application July 28, 1947, Serial No. 764,103

7 Claims. (Cl. 279—4)

This invention relates to apparatus for holding standard collets and the like. More particularly this invention relates to a preloaded air release chuck for use in holding collets in lathes, drill presses and the like.

An object of this invention is to provide a collet chuck for drill presses, lathes and the like in which the work is held by a constant pressure from which it is released by a counteracting air pressure.

Another object of this invention is to provide a work holding chuck for drill presses, lathes and the like that can be opened while in motion.

Still another object of this invention is to provide a chuck of simple construction that will hold work pieces of all sizes with the same pressure.

A further object of this invention is to provide a chuck for use with collets in which no drawbar is necessary.

Other and further objects of this invention will be apparent to those skilled in the art to which this invention relates from the following specification, claims and drawing.

Heretofore air chucks manufactured by various concerns required that air be piped to the revolving spindle and to the chuck and as a result small high speed lathes were seldom if ever equipped with such chucks. In these prior art chucks continuous air pressure was required to hold the work and if the air pressure failed the work was released by the chuck, permitting it to fly out of the chuck.

A feature of the present invention is the provision of a preloaded chuck in which the force of this preloading grips the collet holding the work until the preloading is counteracted by air pressure that may be applied by the operator.

The chuck is provided with a threaded portion for receiving corresponding threads of the collet and this obviates the necessity for using a drawbar. Furthermore, this also prevents the collet from moving laterally when closed and in addition a screw threaded stop may be inserted behind the collet to be used as an adjustable stop for work.

Other features of this invention will be set forth in the specification, claims and drawing in which briefly Fig. 1 is a view in front elevation in fragmentary section of the chuck, and Fig. 2 is a sectional view along the lines 2—2 of Fig. 1.

Referring to the drawing in detail reference numeral 10 designates the chuck housing having a threaded spindle portion 11 adapted to be attached to the threaded spindle of a lathe, drill press, milling machine or the like. A suitable threaded hole 12 substantially in the center of the housing is provided for the purpose of receiving the threaded end of the collet 13 having a slightly tapered hole extending therethrough and having the forward end thereof split in at least three equally spaced places along the circumference so as to be compressible for the purpose of gripping work in said hole. The cavity of the housing 10 is provided with an inflatable elastic lining 14 having a check valve 15 attached thereto for the purpose of permitting inflation of the lining 14 from a suitable source of compressed air. This lining 14 and compressed air are employed for the purpose of applying pressure to the piston 16 so that this piston forces the tapered surface 20 of the cylindrical extension 18 that is integral with the piston 16, into engagement with the inclined surface 19 of the collet 13 and thereby compresses the split end of the collet 13 causing it to grip the work. Suitable gaskets 17 and 21 are provided to the piston 16 and the cylindrical extension 18 and these gaskets may be provided with graphite lubrication.

The collet 13 is also provided with a notch for receiving the spring urged ball 22 therein to limit movement of the collet when it is released by the clamping member 18.

Releasing the collet 13 is accomplished by forcing compressed air into the chamber 34 formed between the piston 16 and the end or cover plate 23 that is bolted over the opening of the housing 10. Compressed air is supplied to the pipe 28 through a small manual valve 29 and when this valve 29 is opened by the operator compressed air flows from the mouth or nozzle 28a of the pipe 28 against the rubber flap 27 and moves this rubber flap 27 out of the way thereby permitting compressed air to enter the space between plate 23 and the disc 25 that is mounted by threads 26 on the cylindrical projection integral with the plate 23. From this space compressed air enters the cavity 34 through the holes 24 and pressure is applied to the piston 16 compressing the plastic chamber 14 and thereby moving the tapered surface 20 of the cylindrical extension 18 inward and releasing pressure on the inclined surface 19 of the collet 13 so that the work gripped by the collet is released.

Ordinarily the compressed air forced into the chamber 34 will leak out of this cavity and permit the pressure in the chamber 14 to again force the cylindrical extension 18 to clamp the collet as previously described. However, in order to release this air pressure from the cavity 34 as desired, a plurality of holes 31 normally closed by the rubber ring 30, are provided to the disc 25 and these holes 31 may be opened by pressing the ring 32 toward the plate or disc 25 causing the pins 33 to move the flap 30 away from the holes 31. Suitable springs are provided around the pins 33 to hold the ring 32 away from the disc 25 and permit the flap 30 to maintain the holes 31 closed. The inner ends of the pins 33 are of course provided with heads to prevent the springs from forcing these pins out of the corresponding holes completely. The flexible rings 27 and 30 may be made of natural or synthetic rubber, plifilm and the like and they are cemented to the disc 25 by suitable cements so that the circumference 27a and adjacent surface of the ring 27 are cemented to the disc 25 and the circumference 30a and adjacent portions of the ring 30 are cemented to the disc 25. In this way the edge 27b of the ring 27 is forced against the adjoining surfaces of the plate 23 and the portions 30b of the ring 30 covering the holes 31 are normally maintained in closed contact with the inner edges of these holes. It is of course obvious that in place of the ring 32, rubber flap 30, pins 33 and holes 31 two or three small manually operated check valves may be threaded into suitable holes formed in the plate 25 to be used for the same purpose of releasing air pressure from the cavity 34. Furthermore, if desired, one or more valves may be provided in the plate 23 and compressed air may be fed into the cavity 34 through these valves instead of past the rubber flap 27. However, in that case the chuck must be brought to a standstill before air pressure can be supplied to the chamber 34 and the work released from the collet. In the construction illustrated air pressure can be fed to the chamber 34 past the flap 27 and through the holes 24 while the chuck is still in motion and the work released from the collet so that a new work piece may be inserted into the collect without bringing the chuck to a standstill.

Furthermore, in some instances it may be desirable to replace the air bladder 14 by a plurality of suitable coil or leaf springs and in that case suitable notches may be provided in the walls of the housing 10 and the piston 16 for receiving and holding the ends of the springs. Employing springs in place of the air bladder 14 however is not desirable where different types of stock are to be held in the chuck. For example, it may be desired to hold steel, brass and similar metallic material in the chuck for certain operations and in that case the pressure in the bladder 14 may be substantial. However, plastic or glass stock may be inserted in the chuck in order operations and in this case the pressure in the lining 14 employed for steel, brass and the like might be considerably too high. By using the inflated lining 14 provided with the valve 15 the pressure may be adjusted for all kinds of stock.

While I have described this apparatus in detail with respect to the preferred embodiment thereof, it is of course apparent that modifications may be made without departing from the scope and spirit of this invention as set forth in the following claims.

I claim:

1. A collet chuck for lathes or the like comprising a substantially circular open ended housing having an annular cavity therein and having a hole substantially in the center thereof, a collet threaded into said hole, a piston positioned in said annular cavity, said piston having a member for engaging and compressing said collet, means for normally holding said member in engagement with said collet, an aperture plate for substantially closing the open end of said housing, a disc shaped member supported on said apertured plate in space relation therewith whereby the apertures through said plate open into the space between said plate and said disc shaped member, a flexible seal for said space and means for forcing compressed air through said seal and said apertures into the space between said plate and said piston for releasing the pressure on said collet.

2. A collet chuck adapted to be mounted on the live spindle of a lathe or the like comprising a substantially circular open ended housing having an annular cavity therein and having a hole substantially in the center thereof, a collet threaded into said hole, a piston positioned in said annular cavity, said piston having a member for engaging and compressing said collet, means for normally holding said piston member in engagement with said collet, an apertured plate for substantially closing the open end of said housing, a disc shaped member supported on said apertured plate in spaced relation therewith whereby the apertures through said plate open into the space between said plate member and said disc shaped member, a flexible seal for said space engaging said plate and said disc shaped member substantially along the circumferences thereof and means for forcing compressed air past said seal and through said apertures into the space between said plate and said piston for releasing the pressure on said collet.

3. In a fluid pressure-operated device, a rotary head structure defining a pressure chamber and a port through a wall thereof connecting said pressure chamber to atmosphere, an inwardly-opening check valve closing said port, and a non-rotary nozzle for directing a highly concentrated jet of fluid under pressure toward said head and the path of rotary travel of the check valve-equipped port.

4. In a fluid pressure-operated device, a rotary head structure incorporating means for mounting on a rotary shaft, said head structure defining a pressure chamber and a port through a wall thereof connecting the pressure chamber to atmosphere, an inwardly-opening check valve closing said port and having a surface exposed to atmosphere through said port, and a non-rotary nozzle adapted for connection to a source of fluid under pressure and positioned to direct a highly concentrated jet of fluid toward the head and the path of travel of the check valve-equipped port, said check valve opening under the impact of the jet when the pressure of the jet against the outer surface of the check valve exceeds the pressure against the inner surface thereof.

5. In a fluid-operated device, a head structure, said head structure defining a pressure chamber and an elongated port through a wall thereof connecting said valve chamber to atmosphere, an inwardly-opening check valve closing said port and having a surface exposed to atmosphere through said port, a nozzle adapted for connection to a source of fluid under pressure and positioned to direct concentrated jet of fluid toward said head and check valve-equipped port, said head and said nozzle being mounted for relative movements one with respect to the other, said check valve closing said port at all points where internal pressure exceeds atmospheric pressure and having sufficient resilience to permit unseating at localized areas of much less extent than the length of the valve port, whereby upon relative movement of said head with respect to said nozzle said valve will be opened only at the constantly changing localized area adjacent said nozzle by the concentrated fluid jet directed by said nozzle against said valve.

6. In a fluid pressure-operated device, a rotary head structure incorporating means for mounting on a rotary shaft, said head structure defining a pressure chamber and an elongated arcuate port through a wall thereof connecting said chamber to atmosphere, an inwardly-opening check valve closing said port and having a surface exposed to atmosphere through said port, and a non-rotary nozzle adapted for connection to a source of fluid under pressure and positioned to direct a concentrated jet of fluid toward the head and the path of travel of the check valve-equipped port, said check valve closing said port at all points where internal pressure exceeds atmospheric pressure and having sufficient resilience to permit unseating at localized areas of much less circumferential extent than the circumferential length of the valve port, whereby upon rotation of said head said valve will be opened only at the constantly changing localized area adjacent said nozzle by the concentrated fluid jet directed by said nozzle against said valve.

7. The structure defined in claim 6 in which said port and said valve are annular in shape and are concentric to the axis of rotation of said head.

ELWIN L. PETERSON.

References Cited in the file of this patent

UNITED STATES PATENTS

| Number | Name | Date |
|---|---|---|
| 728,458 | Hanson | May 19, 1903 |
| 2,360,590 | Schweller | Oct. 17, 1944 |
| 2,370,729 | Hoppe | Mar. 6, 1945 |
| 2,392,999 | Redmer | Jan. 15, 1946 |
| 2,477,773 | Soussloff et al. | Aug. 2, 1949 |
| 2,500,383 | Sadler et al. | Mar. 14, 1950 |